United States Patent [19]

Kaiser et al.

[11] 3,852,338

[45] Dec. 3, 1974

[54] N-SUBSTITUTED PHENYLALANINE DERIVATIVES

[75] Inventors: Ado Kaiser, Neu-Frenkendorf; Wolfgang Koch, Riehen; Marcel Scheer, Basel; Uwe Wölcke, Bottmingen, all of Switzerland

[73] Assignee: Hoffman-La Roche Inc., Nutley, N.J.

[22] Filed: Oct. 21, 1971

[21] Appl. No.: 191,486

[30] Foreign Application Priority Data
Oct. 30, 1970 Switzerland................ 16043/70

[52] U.S. Cl......... 260/501.12, 260/462, 260/471 A, 260/471 C, 260/470, 260/516, 260/519, 424/300, 424/309, 424/316, 414/319, 424/320, 424/327

[51] Int. Cl.......................................... C07c 101/08

[58] Field of Search............... 260/501.12, 519, 516

[56] References Cited
UNITED STATES PATENTS

| | | | |
|---|---|---|---|
| 2,948,714 | 8/1960 | Amiard et al..................... | 260/519 |
| 3,297,737 | 1/1967 | Weck.............................. | 260/462 R |

OTHER PUBLICATIONS

McOmie, Advances in Organic Chemistry Methods and Results, Vol. 3, Interscience Publishers, pp. 191–193, 239–240, 244 (1963).

Weser, Hoppe–Seyler's Z. Physiol. Chem., Band 349, pp. 982–988, (1968).

Lissitzky et al., Compt. Rend. Soc. Biol., Vol. 151, pp. 352–355, (1957).

Bollinger et al., Chemical Abstracts, Vol. 67, Col. 22141g, (1967).

Zervas et al., J. Am. Chem. Soc., Vol. 85, pp. 3660–3666, (1963).

Morrison et al., Organic Chemistry, Allyn & Bacon, Inc., Boston, pp. 871–872, (1962).

*Primary Examiner*—Leon Zitver
*Assistant Examiner*—Michael W. Glynn
*Attorney, Agent, or Firm*—Samuel L. Welt; Jon S. Saxe; George M. Gould

[57] ABSTRACT

Phenylalanine derivatives which are N-substituted with a carbonyl, thio, or sulfonyl substituent useful as hypotensive, anti-pyretic and anti-parkinson agents and processes for their preparation from phenylalanine including intermediates in these processes.

2 Claims, No Drawings

N-SUBSTITUTED PHENYLALANINE DERIVATIVES

SUMMARY OF THE INVENTION

In accordance with this invention, it has been discovered that compounds of the formula:

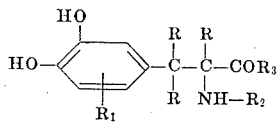

wherein R is hydrogen or alkyl; $R_1$ is hydrogen, halogen, alkyl, alkoxy, nitro or dialkylamino; $R_2$ is

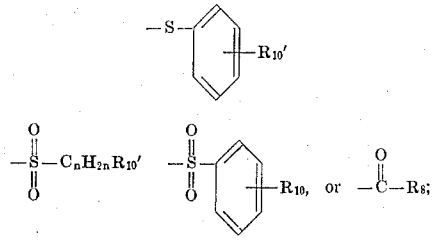

$R_3$ is hydroxy, alkoxy, phenylalkoxy, amino, or alkylamino; $R_{10}$ is hydrogen, hydroxy, alkoxy, alkylsulfonyl, halogen, nitro, cyano, alkylaminocarbonyl, alkanoyloxy or alkyl; $R_8$ is alkoxy, alkylamino or $-C_nH_{2n}R_{12}$; $R_{12}$ is hydrogen, hydroxy, alkoxy, alkylthio, phenylthio, alkylphenylthio, halogen, cyano, carboxy, alkoxycarbonyl, alkylaminocarbonyl, or alkanoyloxy; and $n$ is an integer from 1 to 17;

or pharmaceutically acceptable salts thereof are useful as hypotensive, anti-pyretic and anti-parkinson agents.

The compounds of formula I can be produced by subjecting a boric acid complex of the formula:

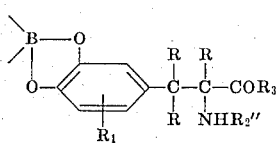

wherein R, $R_1$, and $R_3$ are as above; and $R_2''$ is

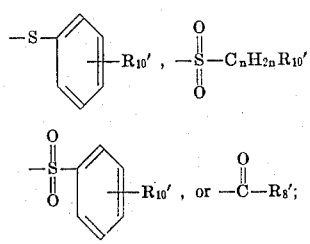

$R_8'$ is alkoxy, alkylamino, or $-C_nH_{2n}R_{12}'$; $R_{10}'$ is hydrogen, alkoxy, alkylsulfonyl, halogen, nitro, cyano, alkylaminocarbonyl, alkanoyloxy or alkyl; $R_{12}'$ is hydrogen, alkoxy, alkylthio, phenylthio, alkylphenylthio, halogen, cyano, alkoxycarbonyl, alkylaminocarbonyl, or alkanoxyloxy; and $n$ is as above, and at the two free valences of the boron atom, there are bound groups which are capable of forming tetra-coordinate complexes with boric acid;

or pharmaceutically acceptable salts thereof to acid hydrolysis.

On the other hand, the compounds of formula I can be prepared by esterification of an acid of the formula:

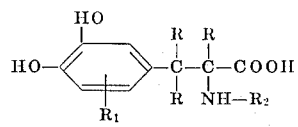

wherein R, $R_1$ and $R_2$ are as above;
or pharmaceutically acceptable salts thereof.

On the other hand, the compound of formula I can be prepared by subjecting an ester of the formula:

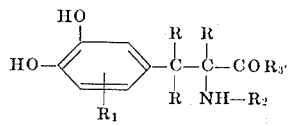

wherein R, $R_1$ and $R_2$ are as above; and $R_3'$ is alkoxy or phenylalkoxy;

to a mild basic hydrolysis or to treatment with ammonia or an alkyl or dialkylamine.

On the other hand, the compound of formula I above can be prepared by subjecting a compound of the formula:

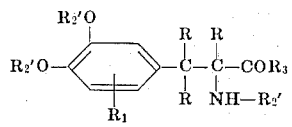

wherein $R_1$ and $R_3$ are as above; and $R_2'$ is

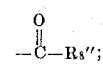

$R_8''$ is alkoxy, alkylamino or $-C_nH_{2n}R_{12}''$; $R_{12}''$ is alkoxy, alkylthio, phenylthio, alkylphenylthio, halogen, cyano, alkoxycarbonyl, alkylaminocarbonyl, or alkanoyloxy; and $n$ is as above;

or pharmaceutically acceptable salts thereof to mild basic hydrolysis.

On the other hand, the compound of formula I above can be prepared by reacting a compound of the formula:

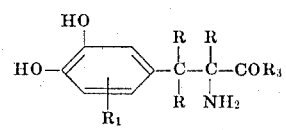

wherein $R_1$, R and $R_3$ are as above; or a pharmaceutically acceptable salt thereof with a compound $$X-R_2'$$

wherein X is a reactive functional derivative of an organic acid, and $R_2'$ is as above;

in an aqueous medium at a pH of at least 10. The product obtained can, if desired, be converted to the corresponding pharmaceutically acceptable salt.

DETAILED DESCRIPTION

When $R_1$, $R_2$ and $R_3$ are aliphatic substituents or contain aliphatic substituents, these aliphatic substituents can contain from 1 to 18 carbon atoms and can be branched chain or straight chain.

The alkyl groups preferably contain from 1 to 7 carbon atoms. Among the preferred alkyl groups are included methyl, isopropyl, n-hexyl or n-heptyl. The alkoxy groups preferably contain from 1 to 7 carbon atoms such as methoxy, ethoxy, isopropoxy, n-hexyloxy or n-heptyloxy. The halogen atom can be fluorine, chlorine, bromine and iodine, with chlorine and bromine being preferred.

When $R_2$ is

alkoxy, i.e., alkoxycarbonyl, this group preferably contains from 2 to 8 carbon atoms. Among the preferred alkoxycarbonyl groups are included methoxycarbonyl, ethoxycarbonyl or t-butoxycarbonyl. When $R_2$ is

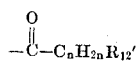

i.e., alkanoyl or substituted alkanoyl, n is preferably an integer from 1 to 7. Among the preferred substituted alkanoyl radicals are included ethoxyacetyl, β-methoxypropionyl and β-methoxypropionyl. When $R_2$ is

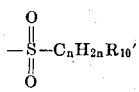

i.e., alkylsulfonyl or substituted alkylsulfonyl, n preferably contains from 1 to 7 carbon atoms.

When $R_2$ is a phenylthio, alkylsulfonyl or phenylsulfonyl, these groups can be substituted in the manner set forth hereinbefore. Among the preferred substituents are included (o-nitro-phenyl)-thio, methoxymethanesulfonyl, and p-toluenesulfonyl.

The compounds of formula I above, in the form which contain bases, are amphoteric in character. These compounds dissolve in water as well as in acids or in alkalies in which they form salts.

In accordance with this invention, the compounds of formula I with their pharmaceutically acceptable salts exhibit the aforementioned beneficial therapeutic properties. The compounds of formula I which contain basic groups form a pharmaceutically acceptable salt, with both inorganic and organic pharmaceutically acceptable acids as well as bases. Among the acids which the compounds of formula I which contain basic groups form pharmaceutically acceptable acid addition salts are included hydrochloric acid, hydrobromic acid, sulfuric acid, phosphoric acid, citric acid, acetic acid, succinic acid, maleic acid, methanesulfonic acid, p-toluenesulfonic acid and the like. Such acid addition salts are also within the scope of the invention. Among the bases into which the compounds of formula I form salts are sodium hydroxide, ammonia, potassium hydroxide, etc.

The preferred phenylalanine derivatives provided by the invention are those which exist in L- or D,L-form.

A preferred group of phenylalanine derivatives provided by this invention comprises those compounds of formula I which R represents a hydrogen atom or the methyl group, especially a hydrogen atom, $R_1$ represents a hydrogen atom and $R_3$ represents a hydroxy group, and salts of these compounds.

Interesting phenylalanine derivatives provided by this invention are:

N-(t-butoxycarbonyl)-L-dopa [N-(t-butoxycarbonyl)-L-3-(3,4-dihydroxyphenyl)-alanine] and its methyl and benzyl ester, N-ethoxyacetyl-L-dopa;

N-[(o-nitrophenyl)-thio]-L-dopa and its methyl ester and N-(p-toluenesulfonyl)-L-dopa;

as well as pharmaceutically acceptable salts of these compounds.

The boric acid complex of formula I-A or salt thereof is formed from a boric acid complex of formula V. The formation of the boric acid complex of formula V is carried out by treating the compound of formula V or a salt thereof with boric acid or a borate salt while maintaining a pH value of at least about 7. Borax is preferably used, although other salts of boric acid such as, for example, the alkali metal metaborates (e.g., sodium metaborate) and the alkali metal pentaborates (e.g., potassium pentaborate) can be also used. Water is preferably used as the solvent, although mixtures of water with an inert organic solvent such as, for example, tetrahydrofuran, dioxan, dimethyl sulfoxide or dimethylformamide can also be used. The treatment is preferably carried out at a temperature between about 0°C. and about 70°C. The treatment is preferably carried out while maintaining a pH value of the aqueous medium at between about 7 and 13. This is achieved by the addition of inorganic bases such as an alkali metal hydroxide or an organic base such as organic amine bases. Among the preferred alkali metal hydroxides are included sodium hydroxide, potassium hydroxide. Among the organic amine bases are included triethylamine, pyridine, etc.

The treatment of a dihydroxyphenylalanine of formula V or salt thereof with boric acid or with a borate salt in the manner described earlier yields a boric acid complex of a compound of formula V or of a salt thereof, wherein the two phenolic hydroxy groups are esterified with boric acid.

In these boric acid complexes of the formula

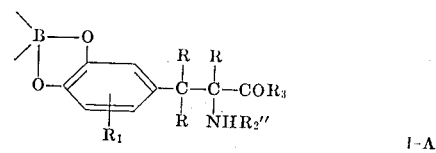

wherein R, $R_1$, $R_2''$ and $R_3$ are as above, the boron atom is bound at the free valences to groups which are capable to form tetracoordinate complexes of boric acid. Such a complex might have, for example, the general formula

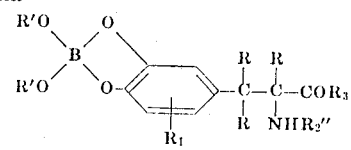

wherein R, $R_1$, $R_2''$ and $R_3$ are as above and R' can be hydrogen, alkyl or substituted alkyl, or the two R' together alkylene or arylene.

This boric acid complex is subsequently reacted with an acylating agent to furnish the acid group $R_2''$ to yield the boric acid complex having the formula I-A or a salt thereof. This acylating agent has the formula:

$$X-R_2'' \qquad \text{XVI}$$

wherein X and $R_2''$ are as above.

In carrying out the acylation reaction, any of the conditions conventional in acylation can be utilized. The compound of the formula XVI is a conventional acylating agent. In the compounds of the formula XVI, X can be any conventional reactive functional derivative of an acid such as a halide, azide, anhydride, or activated ester. Among the conventional activated ester groups are esters formed from n-hydroxysuccinimide, n-hydroxyphthalimide and p-nitrophenol. This reaction can be carried out in an aqueous medium. However, organic solvents can be utilized. Generally, it is preferred to carry out this reaction in an aqueous medium or in a mixture of water with an inert organic solvent. Any conventional inert organic solvent can be utilized. Among the preferred solvents are included tetrahydrofuran, dioxan, dimethylsulfoxide, dimethylformamide, etc. This reaction is generally carried out at a temperature of from 0°C. to about 70°C. and at a pH of above 7, preferably from 7 to 13.

Generally, the formation of the complex of formula I-A is carried out by the addition of the compound of formula XVI to the reaction medium where the complex of formula V was formed. In this case the reaction medium, temperature and pH for the acylation are preferably the same as for the preparation of the boric acid complex of a compound of formula V.

The preparation of the boric acid complex of formula I-A or of a salt thereof used as the starting material in the present process is preferably carried out in situ starting from a compound of formula V. The boric acid complex of the formula I-A or salt thereof which is obtained is preferably employed directly in solution (i.e., without isolation) in the process in accordance with the invention.

The acidic hydrolysis of a boric acid complex of the formula I-A or of a salt thereof in accordance with the present invention is preferably carried out in solution. Preferably, a basic aqueous solution prepared in the manner described earlier is adjusted to a pH of about 1 to about 4 with an acid. The boric acid complex is thereby cleaved and the desired compound of formula I is obtained. As acid agents there are preferably used mineral acids such as sulfuric acid, hydrochloric acid, phosphoric acid, etc., although organic acids such as mono- or polybasic alkanecarboxylic acids (e.g., formic acid, acetic acid, trichloroacetic acid, citric acid, tartaric acid and oxalic acid) can also be used. The acidic hydrolysis can be carried out using the same solvents and at the same temperature as in the preparation of the boric acid complex of a compound of formula V described earlier. Care should be taken not to prolong the acid treatment and elevated temperatures so as not to hydrolyze the compound of formula I-A where $R_3$ is other than hydroxy.

The acidic hydrolysis of a boric acid complex of a compound of formula I-A yields in a particularly simple manner a selectively N-acylated (or N-sulfonylated or N-sulfenylated) compound of formula I which is unsubstituted at the phenolic hydroxy groups. By providing a boric acid complex of the formula I-A, the phenolic hydroxy groups present in the boric acid complex are protected against attack by the acylating agent as well as oxidation by atmospheric oxygen.

In accordance with another embodiment of this invention, an acid of formula II can be esterified; for example, by reaction with a corresponding diazo compound (e.g., diazomethane, diazoethane, diphenyldiazomethane, etc.). This reaction is preferably carried out in the presence of an inert organic solvent such as diethyl ether, tetrahydrofuran, dioxan, dimethylformamide, methylene chloride or ethyl acetate and at a temperature between about 0°C. and the boiling point of the mixture. According to a further method for the esterification of an acid of formula II, the acid can be treated with a base, especialy with a substituted organic base such as triethylamine or dicyclohexylamine. The salt obtained can subsequently be reacted with a halide or sulfate of the formula $R_4Z$ or $(R_4)_2SO_4$ where $R_4$ is alkyl, or phenylalkyl, and Z is a leaving group. Z can be any conventional leaving group. Among the preferred leaving groups are included halogens, especially a chlorine, bromine or iodine or a substituted-sulfonyloxy group such as methanesulfonyloxy, benzenesulfonyloxy, p-toluenesulfonyloxy or p-bromobenzenesulfonyloxy group. This reaction is preferably carried out in the presence of an inert organic solvent, for example, in dimethylformamide, dimethyl sulfoxide or tetrahydrofuran. This reaction is expediently carried out at a temperature between about 0°C. and the boiling point of the reaction mixture.

A still further method, which is suitable to produce a compound of the formula I where $R_2$ is other than

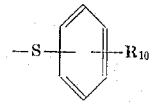

or alkoxycarbonyl consists in reacting an acid of formula II with the corresponding alcohol furnishing the group $R_3$, especially in the presence of an acidic catalyst such as hydrochloric acid, sulphuric acid p-toluenesulphonic acid or thionyl chloride. In this method, an alkanoyloxy group which may be present on the group $R_2$ is converted into the hydroxy group. An alkoxycarbonyl group which may be present on the group $R_2$ is transesterified to an alkoxycarbonyl group corresponding to the alcohol used. A large excess of the alcohol is preferably used, whereby it simultaneously serves as the solvent. The temperature is not critical, but the reaction is preferably carried out at between about 0°C and the boiling point of the reaction mixture.

The mild basic hydrolysis of an ester of formula III in accordance with yet another embodiment of the present process to yield a corresponding acid of formula I is preferably carried out by treating an aqueous or lower-alkanolic solution of an ester of formula III. If desired an inert organic solvent such as tetrahydrofuran or dioxan, with a dilute inoranic base (e.g., with sodium hydroxide, potassium hydroxide or ammonia) or with a quaternary ammonium hydroxide (e.g. tetramethyl ammonium hydroxide) can be present in admixture into the aqueous medium. The mild basic conditions for the hydrolysis are achieved by using the inorganic base or the quaternary ammonium hydroxide in not more than about a 50 percent excess as well as by carrying out the hydrolysis at a temperature between about 0°C and 50°C. Non-quaternary organic bases such as aqueous triethylamine or aqueous pyridine can also be used, in which case these can be employed in a large excess. In the hydrolysis, an alkoxycarbonyl or alkanoyloxy group which may be present on the group $R_2$ is transformed. An alkoxycarbonyl group is converted into a carboxy group and an alkanoyloxy group is converted into a hydroxy group.

The treatment of an ester of formula III with ammonia or an alkyl- or dialkyl-amine in accordance with a further embodiment of the present process to yield a corresponding amide of formula I can be carried out, for example, in an inert organic solvent such as a lower alkanol, tetrahydrofuran, dioxan or dimethyl sulphoxide. If desired, the treatment can be carried out using a large excess of ammonia or the amine which can then simultaneously serve as the solvent. The treatment is preferably carried out at a temperature of about −40°C to +100°C. When ammonia or a volatle amine is used, it is expedient to carry out the treatment in a closed system; for example, at up to 50 atmospheres (gauge). An alkoxycarbonyl or alkanoyloxy group which may be present on the group $R_2$ is transformed during the reaction. An alkoxycarbonyl group is converted into an aminocarbonyl group which may be alkyl-substituted and an alkanoyloxy group is converted into the hydroxy group.

The starting materials of formula IV are prepared by introducing three $R'_2$ groups into a corresponding N/O,O'-unsubstituted compound. This can be carried out, for example, using an excess of the corresponding acid halide (preferably the chloride), acid azide or acid anhydride in the presence of aqueous sodium hydroxide at a pH of about 7 to about 8.5 or in the presence of pyridine in an inert solvent.

The hydrolysis of a starting material of formula IV in accordance with yet a further embodiment of the present process is preferably carried out using a dilute inorganic base such as sodium hydroxide or potassium hydroxide or using a quaternary ammonium hydroxide such as tetramethylammonium hydroxide. The hydrolysis is preferably carried out in an aqueous medium, but it can also be carried out in an inert organic solvent such as, for example, a lower alkanol, tetrahydrofuran or dioxan as well as mixtures of these solvents with water. The hydrolysis is carried out under mild basic conditions so that the acid group $R'_2$ attached to the nitrogen atom is not split off. The mild hydrolysis conditions are maintained by holding the temperature preferably at between about 0°C and 50° and by using not more than than about a 50 percent molar excess of the inorganic base or the quaternary ammonium hydroxide. The hydrolysis can also be carried out using a non-quaternary organic base such as triethylamine, dicyclohexylamine or pyridine in the presence of water, in which case large excesses can be used without running the risk of the acid group $R'_2$ attached to the nitrogen atom being substantially split off. If an ester of formula IV is used as the starting material, there is obtained an acid of formula I. If, on the other hand, an amide of formula IV is used, the amide group is retained in the resulting compound of formula I. An alkoxycarbonyl or alkanoyloxy group which may be attached to the group $R'_2$ is transformed during the hydrolysis; that is to say, an alkoxycarbonyl group is converted into the carboxy group and an alkanoyloxy group is converted into the hydroxy group.

The reaction of a compound of formula V with an agent furnishing the group $R'_2$ i.e., the compound of formula VI in accordance with a still further embodiment of the present process can be carried out, for example, in the presence of an aqueous base such as a caustic alkali (e.g., sodium hydroxide or potassium hydroxide) at a pH above 10 by reaction. X in the compound of formula VI can be any reactive functional derivative of an organic acid such as an acid halide, preferably the chloride; acid azide or acid anhydride. This reaction can be carried out at a temperature between 0°C and 70°C. Where the —$COR_3$ group is an ester group, this is converted into the carboxy group during this reaction. An alkanoyloxy or alkoxycarbonyl group which may be attached to the group $R'_2$ is converted into the hydroxy or carboxy group respectively.

The compounds of formula I hereinbefore contain an acid group $R_2$ which can be split off under strongly acidic conditions, especially at high temperatures. This acid-sensitivity is particularly evident in the case of alkoxycarbonyl groups (e.g., the t-butoxycarbonyl group) as well as in the case of phenylthio groups [e.g., the phenylthio group and the (o-nitrophenyl)-thio group]. In the working up of the product of the present process care should therefore be taken, with regard to the acid groups $R_2$, that the product is not strongly acidified or strongly acidified and heated, since strongly acidic conditions, particular in combination with elevated temperature, can lead to a partial or complete splitting off of these groups with a consequential decrease in the yield.

Racemates of formula I can be resolved; for example, by subjecting an acid of formula I to a fractional crystallization with an optically active base as quinine, brucine, dehydroabietylamine, (+)- or (−)-ephedrine or (+)-or (−)-α-methyl-benzylamine. However, the optically active forms can also be obtained by using pure, optically active starting materials.

The compounds of formula I hereinbefore (the DL-, D- and, especially, the L-form) and their salts are pharmacodynamically active. They are characterized by numerous actions on the nervous system. In particular they possess hypotensive, antipyretic and anti-Parkinson properties.

The compounds of formula I and their salts can be used as medicaments; for example, in the form of pharmaceutical preparations which contain them in association with a compatible pharmaceutical carrier which can be an organic or inorganic inert carrier material suitable for enteral or parenteral administration such as, for example, water, gelatin, gum arabic, lactose, starches, magnesium stearate, talc, vegetable oils, polyalkylene glycols, petroleum jelly, etc. The pharmaceutical preparations can be made up in solid form (e.g., as tablets, dragees, suppositories or capsules) or in liquid form (e.g., as solutions, suspensions or emulsions). The preparation may be sterilized and/or may contain adjuvants such as preserving, stabilizing, wetting or emulsifying agents salts for varying the osmotic pressure or buffers. They can also contain other therapeutically valuable substances.

A pharmaceutical preparation in dosage unit form can expediently contain about 10 mg to about 1,000 mg of active ingredient.

The preparations can also contain one or more peripheral decarboxylase inhibitors, whereby a decrease in the amount of active ingredient to be administered becomes possible. As the decarboxylase inhibitor there can be used any pharmaceutically acceptable substance which inhibits the decarboxylase in the extracerebral organs and thereby prevents the decarboxylation of the active ingredient in these organs.

As the decarboxylase inhibitor there can be used a compound of the general formula

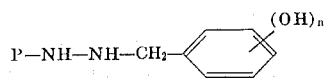

wherein P is hydrogen amino lower alkanoyl or amino-hydroxy lower alkanoyl, $n$ is an integer from 2 to 3, or pharmaceutically acceptable salts thereof.

Example of such decarboxylase inhibitors are:
$N^1$-D,L-seryl-$N^2$-(2,3,4-trihydroxybenzyl)-hydrazide, $N^1$-L-seryl-$N^2$-(2,3,4-trihydroxybenzyl)-hydrazide,
$N^1$-glycyl-$N^2$-(2,3,4-trihydroxybenzyl)-hydrazide,
$N^1$-D,L-tyrosyl-$N^2$-(2,3,4-trihydroxybenzyl)-hydrazide and
$N^1$-L-tyrosyl-$N^2$-(2,3,4-trihydroxybenzyl)-hydrazide,
or a pharmaceutically tolerable salt of one of these compounds.

Other suitable decarboxylase inhibitors are, for example, benzylideneacetophenone, L-3-(3,4-dihydroxyphenyl)-2-methylalanine and compounds of the general formula

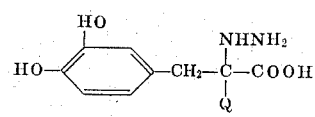

wherein Q is a hydrogen atom or lower alkyl

Where the pharmaceutical preparations contain a decarboxylase inhibitor, the weight ratio of active ingredient to decarboxylase inhibitor expediently amounts to about 1:1 to 10:1.

Where the pharmaceutical preparations contain a decarboxylase inhibitor, a decarboxylase inhibitor can be admixed with the active ingredient and/or the carrier materials or the preparations can be manufactured by compressing the active ingredient, optionally with a carrier material, to a core, providing this core with a coating which is resistant to gastric juice and applying thereover an external layer which contains the decarboxylase inhibitor. In this manner there can be manufactured a pharmaceutical preparation from which, after oral administration, the active ingredient is released with delay only after the decarboxylase inhibitor, preferably, about 30 to 60 minutes after the decarboxylase inhibitor, This has proved to be particularly expedient. In the case of parenteral administraation, the decarboxylase inhibitor is expediently first administered and, about 30 to 60 minutes thereafter, the active ingredient is administered, expediently intravenously.

In the treatment of Parkinsonism, the active ingredient, if desired in combination with a peripheral decarboxylase inhibitor, can be administered either orally or parenterally, especially intravenously.

The amount of active ingredient to be administered per day is governed by the particular case. In general, in the case of oral administration an amount of active ingredient of about 0.1 to about 4 g, especially about 1.5 to about 3 g, will be used. In the case of intravenous administration, the amount of active ingredient administered per day can lie between about 10 mg and about 2 g, especially about 1 g.

As has already been mentioned, the amount of active ingredient to be administered can be decreased by the combined administration of the active ingredient with a peripheral decarboxylase inhibitor. In the case of such a combined administration there are expediently used amounts of active ingredient which lie in the lower part of the aforementioned ranges. For example, 1 g of active ingredient and 100 mg of a decarboxylase inhibitor (ratio 10:1) or 500 mg of active ingredient and 500 mg of a decarboxylase inhibitor (ratio 1:1) can be administered orally per day.

The administration is expediently effected in individual doses divided over the day.

The following Examples illustrate the process provided by the invention:

EXAMPLE 1

An aqueous, alkaline solution containing the boric acid complex of N-(t-butoxycarbonyl)-L-dopa is brought to pH 2.5 with a 10 percent by weight aqueous citric acid solution in an argon atmosphere, saturated with sodium chloride and extracted with two 300 ml portions of ethyl acetate. The combined organic extracts are washed ten times with 500 ml of water, dried over sodium sulphate and concentrated under reduced pressure. The glassy residue obtained is crystallized by digestion with cyclohexane and recrystallized twice from ethyl acetate/cyclohexane to give N-(t-butoxycarbonyl)-L-dopa of melting point 148°C; $[\alpha]_D^{25} = +16.4°$ ($c = 1$ percent in methanol).

EXAMPLE 2

A mixture of 100 g (0.507 mol) of L-dopa, 200 g (0.525 mol) of borax and 1,000 ml of water is treated in an argon atmosphere with 2-N aqueous sodium hydroxide solution until it has a pH value of 9.5. The solution obtained, which contains the boric acid complex of L-dopa, is then treated at one time with half of the crude T-butoxycarbonyl azide prepared from 120 g of t-butoxycarbonyl hydrazide. The resulting mixture is stirred at room temperature for 6 hours, the pH being held between 9.3 and 9.8 by occasional addition of 2-N aqueous sodium hydroxide solution. The remainng t-butoxycarbonyl azide is subsequently added and the mixture is further stirred for 14 hours, after which time the pH value has fallen to 8.5. The pH value is brought to pH 9.5 with 2-N aqueous sodium hydroxide solution and the mixture is stirred for a further 2 hours, then extracted with two 300 ml portions diethyl ether. The aqueous phase, which contains the boric acid complex of N-(t-butoxycarbonyl)-L-dopa, is used in the process without isolation of the product.

EXAMPLE 3

An aqueous alkaline solution containing the boric acid complex of N-ethoxyacetyl-L-dopa is acidified to pH 1 with 6-N aqueous sulphuric acid in an argon atmosphere, saturated with sodium chloride and extracted with two 500 ml portions of ethyl acetate. The organic extracts are washed with two 200 ml portions of saturated sodium chloride solution, combined, dried over sodium sulphate and evaporated under reduced pressure. The residual N-ethoxyacetyl-L-dopa crystallizes on digestion with diisopropyl ether. Recrystallization from isopropanol/diisopropyl ether gives slightly brown-colored crystals of melting point 101°–103°C; $[\alpha]_D^{25} = +35.8$ ($c = 1$ percent in methanol).

EXAMPLE 4

47.3 g (0.386 mol) of ethoxyacetyl chlorride are added dropwise in an argon atmosphere at 5°–10°C in the course of 2 course to a mixture of 120g (0.315 mol) of borax, 65.8g (0.334 mol) of L-dopa, 600 ml of water and 110 ml of 2-N aqueous sodium hydroxide solution, the pH being held between 9.0 and 9.5 by simultaneous addition of 2-N aqueous sodium hydroxide solution. The resulting mixture is stirred at room temperature for a further 2 hours, then is extracted with two 400 ml portions diethyl ether. The aqueous phase, which contains the boric acid complex of N-ethoxyacetyl-L-dopa, is used in the process without isolation of the product.

EXAMPLE 5

An aqueous, alkaline solution containing the boric acid compex of N-(p-toluenesulphonyl)-L-dopa is acidfied to pH 1 with 6-N aqueous sulphuric acid, saturated with sodium chloride and extracted with three 300 ml portions of ethyl acetate. The organic extracts are combined, dried over sodium sulphate and evaporated under reduced pressure. The residual oil crystallizes on digestion with diethyl ether. Recrystallization from ethyl acetate/petroleum ether gives N-(p-toluenesulphonyl)-L-dopa as colorless crystals of melting point 188°C; $[\alpha]_D^{25} = -5.4°$ ($c = 1$ percent in methanol).

EXAMPLE 6

86 g of p-toluenesulphonyl chloride in 300 ml of dioxan are added dropwise in an argon atmosphere with stirring at 5°C to a solution of 77 g of L-dopa and 160 g of borax in 130 ml of 2-N aqueous sodium hydroxide and 700 ml of water. 2-N aqueous sodium hydroxide solution is simultaneously added in such a way that the pH value remains between 9.0 and 9.5. When the addition has been completed, the mixture obtained is stirred at 20°C for a further 2 hours, the pH value being held between 9.0 and 9.5 by occasional addition of 2-N sodium hydroxide solution, then is extracted with two 200 ml portions of diethyl ether. The aqueous phase, which contains the boric acid complex of N-(p-toluenesulphonyl)-L-dopa is used in the process without isolation of the product.

EXAMPLE 7

An aqueous, alkaline solution containing the boric acid complex of N-[(o-nitrophenyl)-thio]-L-dopa is acidified to pH 1 in an argon atmosphere with ice-cooling with 6-N aqueous sulphuric acid and extracted with two 300 ml portions of ethyl acetate. The organic are washed five times with water, then combined, dried over sodium sulphate and evaporated at 30°C/11 mm Hg. with the addition of 20 g of dicyclohexylamine. The residue crystallizes on digestion with diethyl ether and is recrystallized from methanol ether to give N-[(o-nitrophenyl)-thio]-L-dopa dicyclohexylamine salt of melting point 126°C (with decomposition); $[\alpha]_D^{25} = +36°$ ($c = 0.1$ percent methanol).

EXAMPLE 8

A mixture of 19.7 g of L-dopa, 40 g of borax, 50 ml of 2-N aqueous sodium hydroxide solution, 600 ml of water and 200 ml of dioxan is stirred in an argon atmosphere until all has gone into solution (about 15 minutes), then the solution obtained is simultaneously treated dropwise at 20°C with a solution of 21 g of o-nitrophenylsulphenyl chloride in 50 ml of dioxan and with 2-N aqueous sodium hydroxide solution in such a way that the pH value is held between 9.5 and 10. After the addition the mixture is stirred at 20°C for a further 2 hours to give a solution containing the boric acid complex of N-[(o-nitrophenyl)thio]-L-dopa which is used in the process without isolation of the product.

EXAMPLE 9

A solution of 15 g of N-(t-butoxycarbonyl)-L-dopa in 200 ml of diethyl ether is treated dropwise over a period of 10 minutes with the calculated amount of an ethereal diazomethane solution. 2 ml of glacial acetic acid are subsequently added, and the resulting mixture is extracted with saturated aqueous sodium bicarbonate solution, dried over sodium sulphate and evaporated at 40°C/12 mm Hg. with the addition of toluene. The residue is recrystallized from toluene to yield N-(t-butoxycarbonyl)-L-dopa methyl ester as colorless crystals of melting point 131°–133°C (with decomposition); $[\alpha]_D^{25} = +12.3°$ ($c = 1$ percent in methanol).

EXAMPLE 10

A mixture of 10 g of N-(t-butoxycarbonyl)-L-dopa, 6.1 g of dicyclohexylamine, 5.76 g of benzyl bromide and 50 ml of absolute dimethylformamide is stirred in an argon atmosphere for 14 hours (the temperature initially rises to 24°C). The dicyclohexylamine hydrobromide which is precipitated is filtered off and the filtrate is evaporated under reduced pressure. The oily residue is taken up in 200 ml of ethyl acetate and the solution is successively extracted with two 100 ml portions of 2-N aqueous sulphuric acid, two 100 ml portions of water and two 100 ml portions of saturated aqueous sodium bicarbonate solution, dried over sodium sulphate and evaporated under reduced pressure to yield N-(butoxycarbonyl)-L-dopa benzyl ester as a non-crystallizing brown glass; $[\alpha]_D^{25} = -4.2°$ ($c = 1$ percent in methanol).

EXAMPLE 11

53.1 g of N-[(o-nitrophenyl)-thio]-L-dopa dicyclohexylamine salt are shaken with 1,000 ml of diethyl ether and 300 ml of 2-N aqueous hydrochloric acid for 1 hour, then the ether phase, which contains N-[(o-nitrophenyl)-thio]-L-dopa, is dried over sodium sulphate and filtered. The filtrate is treated dropwise with ice-cooling with the calculated amount of a solution of diazomethane in diethyl ether, washed with saturated aqueous sodium bicarbonate solution, dried over sodium sulphate and evaporated under reduced pressure to yield N-[(o-nitrophenyl)-thio]-L-dopa methyl ester as a brown-colored oil.

The following Examples illustrate pharmaceutical preparations containing the phenylalanine derivatives provided by the invention:

EXAMPLE 12

Tablets of the following composition:

| | |
|---|---|
| N-ethoxyacetyl-L-dopa | 100 mg |
| lactose | 61 mg |
| corn starch | 30 mg |
| polyvinylpyrrolidone | 4 mg |
| talcum | 5 mg | are prepared by mixing the active ingredient with the lactose and the corn starch, adding a solution of polyvinyl-pyrrolidone in 40 ml of ethanol, granulating the mixture, drying the granulate at 30°C, mixing with talcum and compressing to tablets

| | |
|---|---|
| Individual weight one tablet | 200 mg |
| Active ingredient content of one tablet | 100 mg |

EXAMPLE 13

Gelatin capsules of the following composition:

| | |
|---|---|
| N-(t-butoxycarbonyl)-L-dopa | 50 mg |
| mannitol | 98.5 mg |
| stearic acid | 1.5 mg | are prepared by homogeneously mixing the ingredients and filling the mixture into No. 2 interlocking gelatin capsules via a capsule-filling machine.

| | |
|---|---|
| Individual weight of one capsule | 150 mg |
| Active ingredient content of one capsule | 50 mg |

We claim:

1. N-[(o-nitrophenyl)-thio]-L-dopa or salts thereof with pharmaceutically acceptable acids or bases.

2. The compound of claim 1 wherein said compound is N-[(o-nitrophenyl)-thio]-L-dopa dicyclohexylamine salt.

* * * * *